US012724905B2

(12) United States Patent
Kim et al.

(10) Patent No.: US 12,724,905 B2
(45) Date of Patent: Sep. 1, 2026

(54) SYSTEM ON CHIP AND OPERATING METHOD THEREOF

(71) Applicant: Samsung Electronics Co., Ltd., Suwon-si (KR)

(72) Inventors: Sung Hyun Kim, Anyang-si (KR); Jun Ho Huh, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 472 days.

(21) Appl. No.: 17/518,013

(22) Filed: Nov. 3, 2021

(65) Prior Publication Data

US 2022/0277088 A1 Sep. 1, 2022

(30) Foreign Application Priority Data

Feb. 26, 2021 (KR) ........................ 10-2021-0026097

(51) Int. Cl.
*G06F 21/60* (2013.01)
*G06F 7/58* (2006.01)
(Continued)

(52) U.S. Cl.
CPC ............ *G06F 21/602* (2013.01); *G06F 7/588* (2013.01); *G06F 15/7807* (2013.01); (Continued)

(58) Field of Classification Search
CPC .... G06F 21/602; G06F 7/588; G06F 15/7807; G06F 21/54; G06F 21/575; G06F 21/79; (Continued)

(56) References Cited

U.S. PATENT DOCUMENTS 9,443,107 B2 9/2016 Dent
9,881,161 B2 * 1/2018 Jang ........................ G06F 21/84
(Continued)

FOREIGN PATENT DOCUMENTS

KR 2010-0015077 A 2/2010
KR 10-1475821 B1 12/2014
(Continued)

OTHER PUBLICATIONS

"Smart Cards; Smart Secure Platform (SSP); Requirements Specification" ETSI TS 103 465, V15.0.0, pp. 1-52 (2019).
(Continued)

*Primary Examiner* — Joseph G Ustaris
(74) *Attorney, Agent, or Firm* — Harness, Dickey & Pierce, P.L.C.

(57) ABSTRACT

An System on Chip (SoC) including a secure element is provided. A method of the SoC comprises generating a random number when power is turned on, generating a seed table according to the random number on the basis of a seed table operation policy, masking a first data with a first data seed value corresponding to a target address in the seed table, encrypting the masked first data with a first type first encryption key in the seed table and writing the first encrypted first data to the target address of an external memory, wherein one of the data seed value or the first type first encryption key changes dynamically.

20 Claims, 13 Drawing Sheets

(51) Int. Cl.

| | |
|---|---|
| ***G06F 15/78*** | (2006.01) |
| ***G06F 21/54*** | (2013.01) |
| ***G06F 21/57*** | (2013.01) |
| ***G06F 21/79*** | (2013.01) |
| *G06F 21/10* | (2013.01) |

(52) U.S. Cl.
CPC ............ *G06F 21/54* (2013.01); *G06F 21/575* (2013.01); *G06F 21/79* (2013.01); *G06F 21/107* (2023.08)

(58) Field of Classification Search
CPC .. G06F 21/107; G06F 21/6218; G06F 15/781; G06F 21/6209; G06F 21/72; H04L 9/0822
See application file for complete search history.

(56) References Cited

U.S. PATENT DOCUMENTS

| | | | | |
|---|---|---|---|---|
| 10,256,973 | B2 | 4/2019 | Kumar et al. | |
| 10,474,796 | B2 | 11/2019 | Pitu | |
| 10,685,139 | B2 | 6/2020 | Harp | |
| 10,754,970 | B2 | 8/2020 | Cachin et al. | |
| 2010/0027788 | A1* | 2/2010 | Tkacik | H04L 9/302 708/250 |
| 2016/0299854 | A1 | 10/2016 | Deivasigamani et al. | |
| 2017/0206030 | A1* | 7/2017 | Woo | G06F 12/1408 |
| 2017/0262626 | A1* | 9/2017 | Teegavarapu | G06F 21/445 |
| 2019/0156069 | A1* | 5/2019 | Heo | G06F 21/78 |
| 2022/0198027 | A1* | 6/2022 | Chhabra | G06F 21/74 |
| 2023/0027142 | A1* | 1/2023 | Li | H04L 9/0869 |

FOREIGN PATENT DOCUMENTS

| | | | | |
|---|---|---|---|---|
| KR | 2017-0085638 A | | 7/2017 | |
| WO | WO-2020036602 A1 | * | 2/2020 | G06F 21/57 |

OTHER PUBLICATIONS

Office Action for Korean Application No. 10-2021-0026097 dated May 15, 2025.

* cited by examiner 1000
1
SoC
10
REE
20
TEE
100
iSE
110
CPU
170
iMemory
190
iSE H/W
30
Host H/W
200
NVM
300
eMEMORY
400
SE
NVM 110
CPU
111
Cache
120
Random No. Generator
130
DUD Block
Data
Address
131
DUD Seed Table Manager
133
DUD Seed Feeder
132
DUD-Seed Tables
Address 1
Seed Value D1
Address 2
Seed Value D2
Address 3
Seed Value D3
Address N
Seed Value DN
Seed Value D
137
135
140
(Data)
(Data)
Address
Encrypted Data
Decrypted Data
Key
Seed value 110
CPU
111
Cache
120
Random No. Generator
150
DUK Block
Address
153
DUK Seed Feeder
152
DUK-Seed Tables
Address 1
Seed Value K1
Address 2
Seed Value K2
...
Address N
Seed Value KN
151
DUK Seed Table Manager
Seed Value K
160
Address
Encrypted Data
Decrypted Data
Key
Seed value 300
External MEMORY
100'
iSE
140
En/De Crytion Engine
Key
Key Register
160
131
DUD Block
DUK Block
150'
DUD ST
DUK ST
110
CPU
Cache
122
Seed Table Manager
121
Random No. Generator
Address
Encrypted Data
Decrypted Data
Key 100 iSE
110 CPU
111 Cache
120 Random No. Generator
130 DUD Block
140 En/De Crytion Engine
150 DUK Block
160 Key Register
300 eMEMORY
Add
Key

SYSTEM ON CHIP AND OPERATING METHOD THEREOF

CROSS-REFERENCE TO RELATED APPLICATION

This application claims priority from Korean Patent Application No. 10-2021-0026097 filed on Feb. 26, 2021 in the Korean Intellectual Property Office, and all the benefits accruing therefrom under 35 U.S.C. 119, the contents of which in its entirety are herein incorporated by reference.

BACKGROUND

Some example embodiments relate to a system on chip and/or an operating method, and more particularly, to a method and/or an apparatus for performing encryption/decryption of data on the system on chip including a secure element.

In general, in a system on chip, as shown in FIG. 1, a central processor unit (CPU), a memory and other peripherals are connected, using a bus BUS which corresponds to a common data transmission line. Recently, for expandability of a single chip, internal bus signals of the system on chip have been connected to the outside such that the memory or the peripherals may be added to the system on chip.

On the other hand, with the development of electrical and electronic techniques, information that is more valuable than in the past have been digitized, and interests in security and/or copyright of the information have increased. For example, if a user's personal information such as any of an ID, a password, and a certificate used for electronic transaction is leaked, damage due to an illegal or improper or unauthorized use of user's name may occur, and when a firmware of a specific device is leaked, since the firmware may be used for purposes other than the manufacturer's intention through the leaked firmware, researches on security and/or copyright for preventing or solving these problems are being actively conducted.

Some security techniques have been provided to protect the aforementioned important information. For example, a technique for encrypting and storing important information at a software level, a technique for using a dedicated encryption interface for a physically accessible external memory and/or peripherals, a technique for internally designing a dual structure to prevent or reduce the likelihood of information extraction of the internal memory due to a multiprocessor, and a technique for controlling an access for each area at a bus level are provided.

SUMMARY

In the system on chip, applications that require a high level of security are implemented, using separate CPU and internal memory. However, there may be limits on the applications that may be implemented, due to the capacity limitation of internal memory.

Some example embodiments provide a system on chip that is safe or safer against attack from the outside, while expanding the capacity of the application by utilizing the external memory, and an operating method thereof.

Specifically, some example embodiments provide a system on chip that encrypts and decrypts information at a hardware level, and/or an operating method thereof.

Some example embodiments also provide a system on chip that dynamically changes a seed for encryption depending on memory location and time variation to provide improved data integrity, and an operating method thereof.

According to some example embodiments, an operating method of SoC (System on Chip) including a secure element includes generating a random number in response to power of the SoC being turned on, generating a seed table based on the random number, the generating the seed table on the basis of a seed table operation policy, masking a first data with a first data seed value corresponding to a target address of the seed table, encrypting the masked first data with a first type first encryption key of the seed table, and writing the first encrypted first data to the target address of an external memory. At least one of the data seed value or the first type first encryption key is reset upon the SoC being turned on.

According to some example embodiments, a SoC (System On Chip) connected to an external memory includes secure element circuitry which includes a CPU and processing circuitry configured to output a target address and a write command. The processing circuitry is configured to, mask a first data with a data seed value corresponding to the target address of a data seed table, extract a key seed value corresponding to the target address from the key seed table to generate a first type encryption key, encrypt the masked first data with the first type encryption key, and store the encrypted first data in the external memory. At least one of the data seed value or the first type encryption key is configured to change dynamically based on a seed table operation policy.

According to some example embodiments, an operating method of a secure element includes generating a random number in a time-dependent manner and setting a data seed table policy, the setting the seed table in response to power of the secure element being turned on, setting a data seed table corresponding to the random number in accordance with the data seed table policy, reading first data from a non-volatile memory device, masking the first data with a data seed value corresponding to a target address of an external memory, and writing the masked first data to the target address of the external memory.

According to some example embodiments, an SoC (System on Chip) includes secure element circuitry configured to mask a first data read from a non-volatile memory device, to first encrypt the first data with a first type encryption key, and to transmit the first data to an external memory. The external memory is configured to store the first encrypted data at a target address, and the secure element circuitry is configured to mask the first data with a data seed value and the first type encryption key corresponding to the target address.

Alternatively or additionally, some example embodiments provide a system on chip that dynamically changes a seed for encryption depending on memory location and time variation to prevent or reduce the likelihood of an external intended attack, and/or an operating method thereof.

DETAILED DESCRIPTION OF SOME EXAMPLE EMBODIMENTS

Some example embodiments may be implemented to comply with rules of Smart Cards, for example Smart Secure Platform ETSI TS 103 465, specifically 103-666-1 and 103-666-2. Alternatively or additionally, some example embodiments may be implemented to comply with rules of the Global Platform Virtual Primary Platform.

Although terms such as first and second are used to describe various elements or components, it is a matter of course that these elements or components are not limited by these terms. For example, an encryption key may be described as a first type, a second type, and the like. These terms are used to merely distinguish a single element or component from other elements or components. Therefore, the first element or component described below may be a second element or component within the technical idea of the present invention.

Hereinafter, embodiments according to the technical idea of example embodiments will be described referring to the accompanying drawings.

Figure 1:
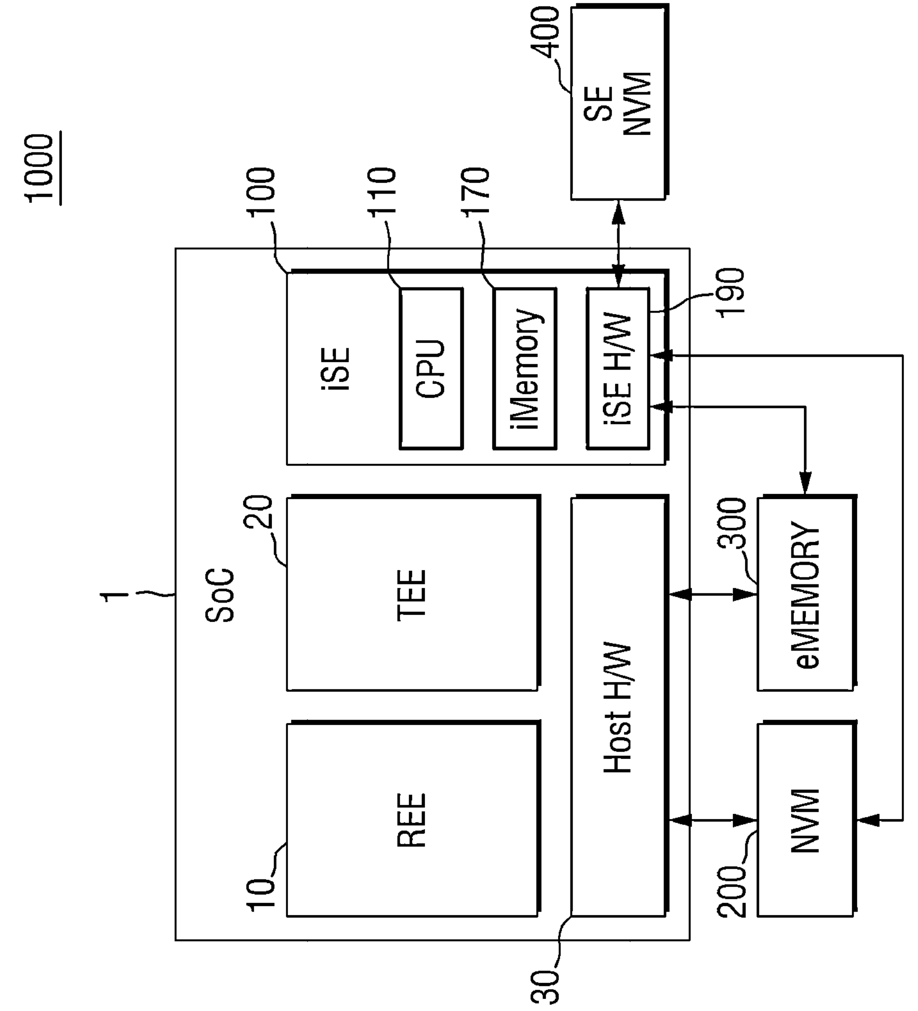
FIG. 1 is a diagram showing a system on chip according to some example embodiments.

FIG. 1 is a diagram showing a system on chip according to some example embodiments.

Referring to FIG. 1, the system on chip 1 includes an execution environment REE 10 and a TEE 20, a host hardware 30, and a secure element (SE) 100.

For example, a system on chip (hereafter referred to as SoC) 1 may be implemented as an application processor and may be included in an electronic device. The SoC 1 may control the overall operation of the electronic device, and control at least one other component. The SoC 1 drives an OS (Operating System) and an application, and may perform various computation and data processing. The SoC 1 may be or include correspond to a dedicated processor (e.g., an embedded processor) for performing a specific operation, and/or a generic-purpose processor that may perform the operations by executing one or more software programs stored in the memory device. For example, the SoC 1 may be implemented as at least one of a central processing unit (CPU), a microprocessor, or a CP (Communication Processor). In some example embodiments, the SoC 1 may include an area for performing general computation, and an area for performing processing associated with processing security-related data. One of the areas may be separate from, included in, or include portions of the other area.

According to some example embodiments, the electronic device including SoC 1 may be, but is not limited to, at least one of a smartphone, a tablet PC, a PC, a smart TV, a mobile phone, a PDA (personal digital assistant), a laptop, a media player, a micro server, a GPS (global positioning system) device, an e-book terminal, a digital broadcasting terminal, a navigation, a kiosk, an MP3 player, a digital camera, home appliance and other mobile or non-mobile computing devices. Further, the electronic device may be or include at least one of a wearable device such as a watch, glasses, a hair band or a ring having a data processing function. However, the electronic device is not limited thereto, and may include all types of devices that operate on the basis of OS, using a processor.

According to some example embodiments, the SoC 1 may be connected to a non-volatile memory device 200 and an external memory 300. The SoC 1 may further include a host hardware module 30, which may interface transmission and reception of data to and from the non-volatile memory device 200 and the external memory 300.

According to some example embodiments, the SoC 1 may be connected or directly connected to a dedicated memory 400 which is connected or directly connected to the iSE 100 to store the security data. The dedicated memory 400 may not be connected to the host hardware module 30.

According to some example embodiments, the SoC 1 may include a rich execution environment processor (hereinafter referred to as REE) 10, and a trusted execution environment processor (hereinafter referred to as TEE) 20. The REE 10 and the TEE 20 may be implemented to be physically isolated (e.g. may have hardware based isolation) in the SoC 1 according to some example embodiments.

The REE 10 is or includes a non-trusted execution environment (NTEE), and may perform non-security operation for application in the rich operating system. For example, REE 10 may perform general computation that does not require or use security, control components that are not associated with security, and transmit and receive the general data that is not to be secure and can be open.

The TEE 20 performs the security operation for the application in the trusted execution environment, that is, the security execution environment. For example, the TEE 20 may perform the operation that requires or uses security, control security-related components, and transmit and receive the security data. The security data may include, for example, at least one of information about a security application or information associated with a financial payment service, and information associated with an embedded service. Information about the security application may include biometric information such as user authentication information; however, example embodiments are not limited thereto. The TEE 20 may be or may include a security area having the same security level as the iSE 100, and may function as a drive of the iSE 100.

The iSE (internal Secure Element) 100 may install and/or drive a security application and/or may store security data, depending on the drive of the TEE 20. The iSE 100 may include at least one of hardware, software, interface, and protocols that provide the execution of applications for secure storage and payment, authentication or various other services.

According to some example embodiments, the iSE 100 may be installed in the form of a universal integrated circuit card (UICC) that may be inserted into a slot of the SoC 1, and/or in the form of being buried in the SoC 1.

According to some example embodiments, the iSE 100 may transmit and receive data to and from the TEE 20 through a secure channel. The iSE 100 decrypts the encrypted information received from the TEE 20 through the secure channel, and may store the encrypted information in at least one of the internal memory 170 of the iSE 100, the external memory 300 or a dedicated external memory 400 connected to the iSE 100.

The internal memory 170 stores security data, program code executed by the iSE 100, and/or the like. At this time, the capacity of the embedded internal memory 170 may be limited. Example embodiments may implement a separate area that is safe or safer against external attacks such as a physical attack in the external memory 300 connected to the SoC 1, and may overcome or partially overcome the limits of the internal memory 170.

According to some example embodiments, the external memory 300 may be implemented as a volatile memory such as at least one of a DRAM (dynamic random access memory) and a SRAM (static random access memory). The external memory 300 may include a normal area and a security area corresponding to each of the REE 10 and the TEE 20. Data stored in the security area of the external memory 300 needs to or should maintain confidentiality and/or integrity. Even when an external attacker acquires the data stored in the external memory 300, the iSE 100 may maintain the data integrity as invalid data, by changing the D encryption key or seed value used for data confidentiality in a time-dependent manner (to be described below in more detail).

According to some example embodiments, the iSE 100 may include a CPU (Central Processing Unit, hereafter CPU) 110, an internal memory iMemory 170, and a secure hardware module 190. For example, the configuration and operation of the iSE 100 will be described below in FIG. 2.

The non-volatile memory device 200 may include a normal area and a security area corresponding to each of the REE 10 and the TEE 20. The normal area and the security area may not have any common area of overlap. The security area of the non-volatile memory device 200 may store code and/or data and an anti-replay counter (hereinafter, ARC). The anti-replay counter may increase a count value each time a code and/or data is transmitted, thereby checking the integrity of the code and/or data. The non-volatile memory device 200 may encrypt and store the code or data with an F encryption key. The host hardware module 30 may encrypt the data transmitted to the non-volatile memory device 200 from the SoC 1, and decrypt the data received from the SoC 200 to the non-volatile memory device 200, using the F encryption key.

The dedicated external memory 400 may be implemented as a non-volatile memory such as at least one of a flash memory, a phase change memory (PCRAM), a resistance change memory (ReRAM), a ferroelectric memory (Fe-RAM), and a magnetoresistive memory (MRAM). The dedicated external memory 400 may store, for example, at least one of an ARC count value, at least two F encryption keys (F_key 1 to N), and security data Data.

Figure 2:
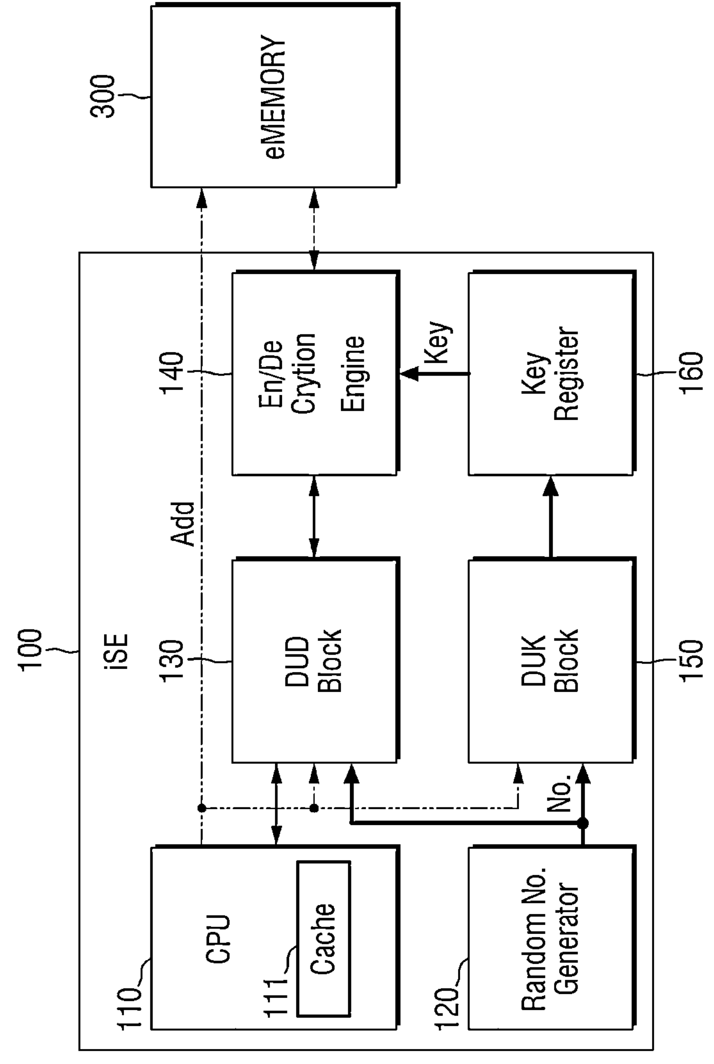
FIG. 2 is a block diagram showing a specific configuration of the secure element according to some example embodiments.
Figure 2:
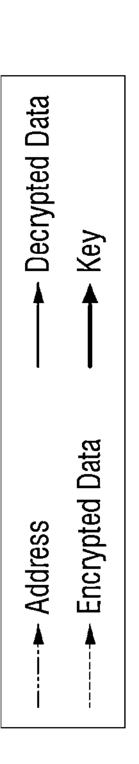
Figure 3:
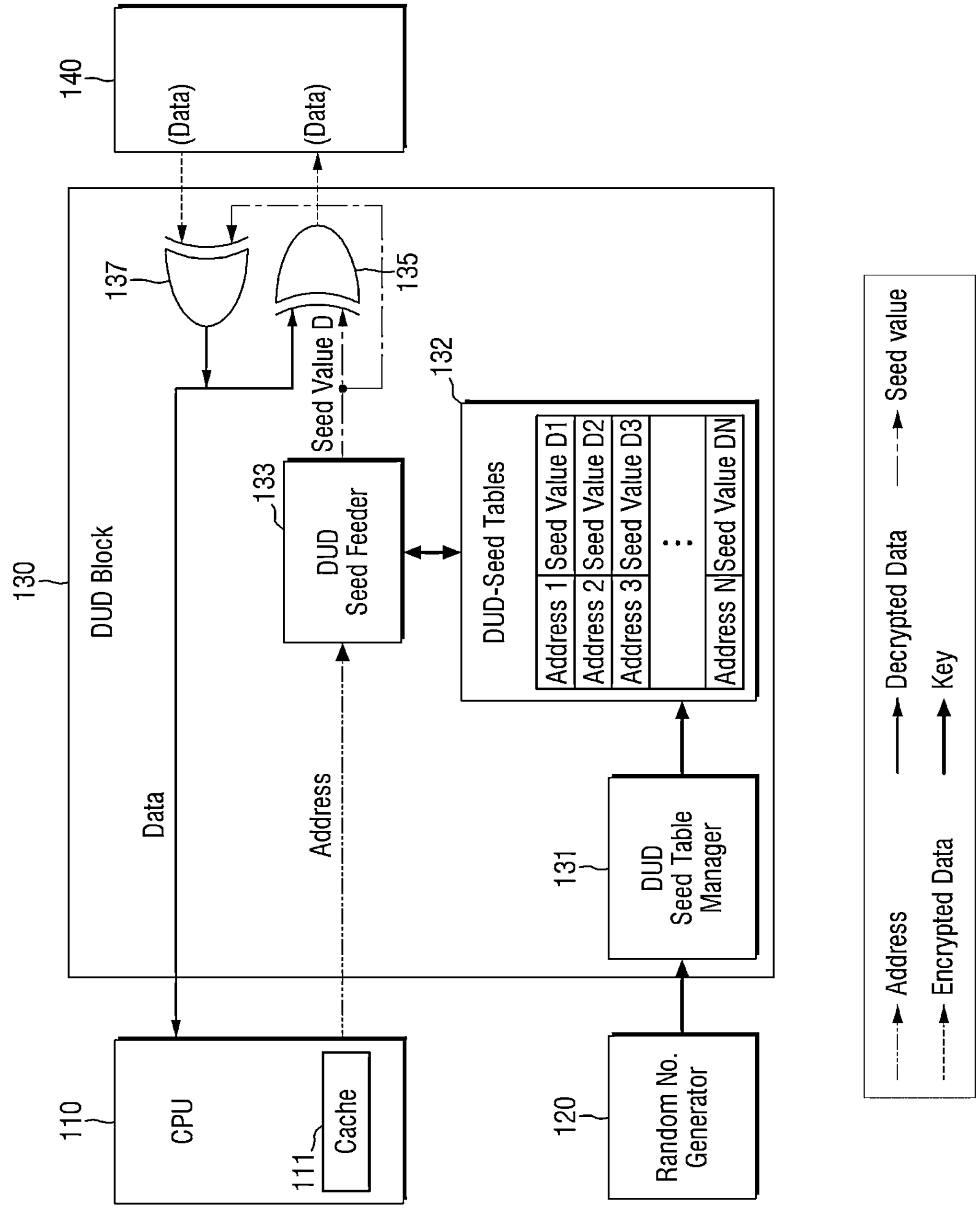
FIG. 3 is a block diagram showing a specific configuration of the data block shown in FIG. 2.
Figure 4:
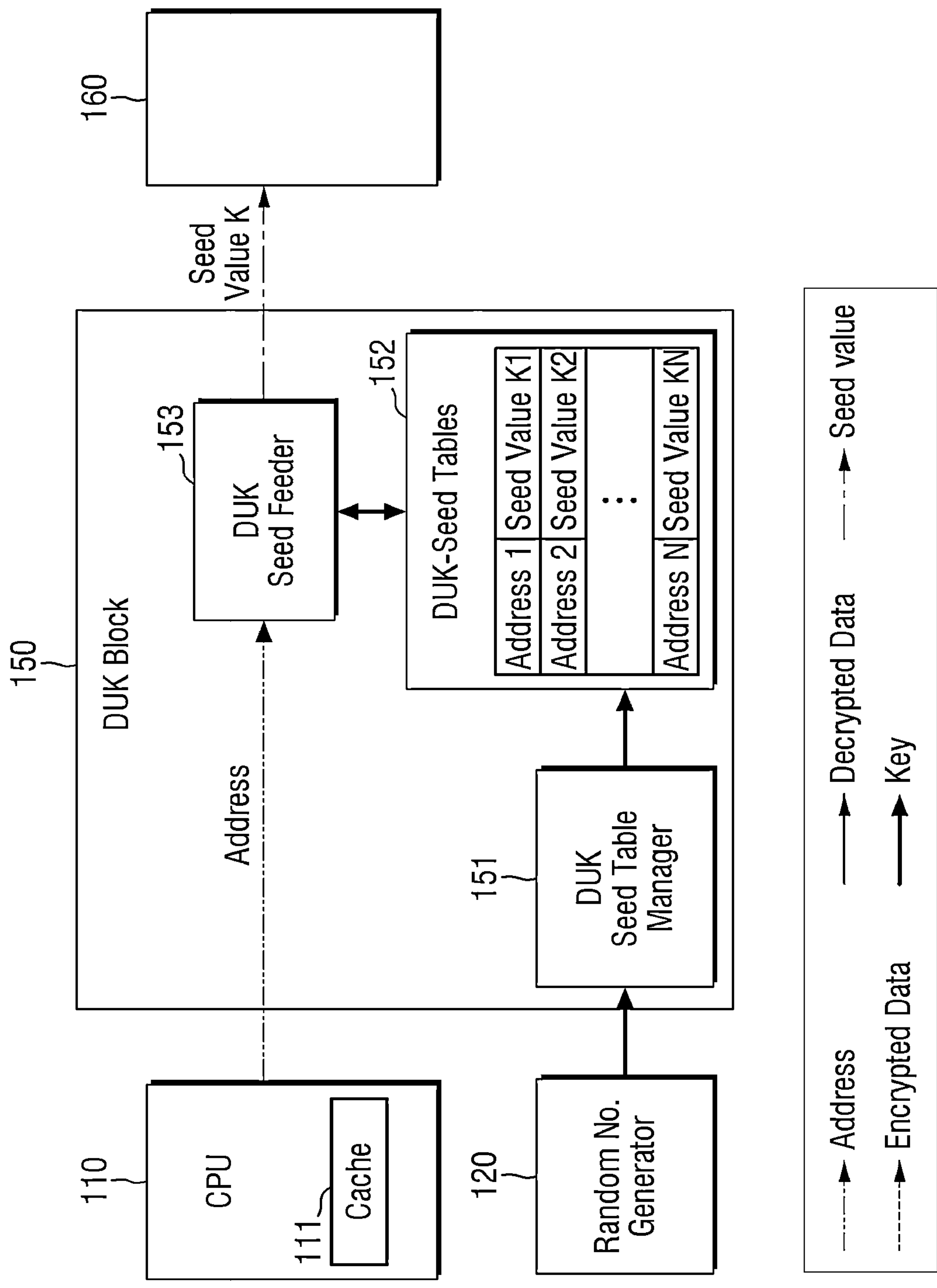
FIG. 4 is a block diagram showing a specific configuration of a key block shown in FIG. 2.

FIG. 2 is a block diagram showing a specific configuration of the secure element according to some example embodiments, FIG. 3 is a block diagram showing a specific configuration of the data block shown in FIG. 2, and FIG. 4 is a block diagram showing a specific configuration of a key block shown in FIG. 2.

Referring to FIG. 2, the iSE 100 may include a CPU 110, a random number generator 120, a data block (DUD) 130, an encryption engine 140, a key block (DUK) 150, and a key register 160. As an example, the random number generator 120, the data block 130, the encryption engine 140, the key block 150, and the key register 160 may be included in the secure hardware module 190. As another example, at least one of the random number generator 120, the data block 130, the encryption engine 140, the key block 150, and the key register 160 may be implemented separately from the secure hardware module 190.

Each component of the iSE 100, for example, the random number generator 120, the data block (DUD) 130, the encryption engine 140, the key block (DUK) 150, the key register 160, and the like may be implemented as separate processing circuits, and may be implemented as a single processing circuit according to some example embodiments. Here, the processing circuit may be a software type such as a program code based on an algorithm, may be implemented as hardware that performs a specific operation, and may be implemented in a combined form of software and hardware.

The CPU 110 controls the overall operation of the iSE 100. For example, the CPU 110 may receive the control command received from the TEE 30 and decode the control command to the iSE internal command and the target address, and may control the operations of the components of the iSE 100 according to the iSE internal command. For example, the CPU 110 may read the data stored in the target address of one of the non-volatile memory 200, the external memory 300, and the dedicated memory 400, and may execute the computation corresponding to the iSE internal command.

The random number generator 120 may generate a random number. The random number generator 120 may generate the random number aperiodically and/or periodically depending on certain, e.g., certain predetermined, conditions according to some example embodiments. For example, the random number generator 120 may generate the random number separately, each time the power of the SoC 1 is turned on. Alternatively or additionally, for example, the random number generator 120 may generate the random number at a predetermined cycle in a time-dependent manner. Alternatively or additionally, for example, the random number generator 120 may generate the random number aperiodically depending on a trigger condition such as a predetermined trigger condition.

The data block 130 and the key block 140 may generate a seed value and a D encryption key on the basis of the random number and the target address.

Referring to FIGS. 2 and 3, the data block 130 may mask/unmask the transmitted and received data.

As used herein, "masking" and "unmasking" may refer to Boolean masking and Boolean unmasking, and may include, for example, operations such as logical XOR operations to be described below in more detail.

The data block 130 receives data (decrypted data) based on the target address Address and iSE internal command (hereinafter, command) from the CPU 110, and may transmit the data to the external memory 300, according to some example embodiments. The data block 130 may mask the data (decrypted data) with a seed value and may transmit the data to the external memory 300.

Alternatively or additionally, the data block 130 may transmit data (encrypted data) based on the iSE internal command (hereinafter, command) from the external memory 300 to the CPU 110 according to some example embodiments. The data block 130 may unmask the encrypted data with a seed value and transmit the data to the CPU 110.

The data block 130 may generate, e.g. may generate in response to a power-on of the SoC 1, a data seed table corresponding to the random number according to the set data seed table operation policy. The data seed table may include a plurality of seed values that are mapped to each of the plurality of addresses. The aforementioned address may be an address of data for executing encryption/decryption, for example, an address of the external memory 300. According to some example embodiments, there may be a plurality of data seed table operation policies, and at least one data seed table operation policy may be set according to user's settings and system settings.

The data block 130 may extract one of the seed values by referring to the target address from the generated data seed table, and may store the extracted seed value.

According to some example embodiments, the data block 130 may include a data seed table manager 131, a data seed table storage unit 132, a data seed feeder 133, and masking circuits 135 and 137. The data seed table manager 131 may set at least one data seed table operation policy. As an example, the data seed table manager 131 may set at least one operation policy, depending on user's settings and/or on system settings. The operation policy may include, for example, policy of at least one of memory block size, address, and update cycle of data seed table.

The data seed table manager 131 may generate the data seed table according to operation policy on the basis of the random number. In some example embodiments, the data seed table manager 131 may also change the table element for the entire security area 350 of external memory 300 on the basis of the operation policy, may change the table element for a part of the security area 350, or may vary the change position or the change cycle by the operation policy. For example, the seed table operation policy may correspond to at least one of a variable range scheme of the table element, a variable scheme of position, or a change cycle.

The data seed table storage unit 132 stores the data seed table generated from the data seed table manager 131. The data seed table may be or may include a plurality of data seed values (Seed Value D1 to Seed Value DN) which are mapped to each of a plurality of addresses (Address 1 to Address N).

When the data seed feeder 133 receives the target address from the CPU 110, the data seed feeder 133 extracts a seed value (Seed Value Dk) corresponding to the target address (Address k) from the data seed table stored in the data seed table storage unit 132.

The masking circuits 135 and 137 may mask and/or unmask the data on the basis of the seed value extracted from the data seed feeder 133. As an example, the masking circuits 135 and 137 may generate data and seed value as masking data by an XOR computation, and/or perform the XOR computation of the masking data and seed value to generate unmasking data. As an example, the masking circuits 135 and 137 may be implemented separately as XOR circuit in each of a transmission path and a reception path. Alternatively, as another example, the masking circuits 135 and 137 may be implemented as a single XOR circuit to perform masking and/or unmasking computation in common for the transmission path and the reception path.

For example, the masking circuit 135 may perform the XOR computation of the data DATA received from the CPU 110 and the seed value, and may output the masking data DATA to the encryption engine 140. For example, the masking circuit 137 performs the XOR computation of the masking data DATA received from the encryption engine 140 and the seed value, and outputs the unmasking data DATA to the CPU 110.

The encryption engine 140 encrypts the masking data (decrypted data) by the D encryption key, transmits the encrypted data to the external memory 300, and decrypts the data (encrypted data) received from the external memory 300 by the D encryption key and transmits the decrypted Data to the data block 130.

According to some example embodiments, the D encryption key may be stored in the key register 160.

The key block 150 may store a plurality of D encryption keys. The key block 150 may store a plurality of specific (or, alternatively, predetermined) D encryption keys according to some example embodiments, and may store the plurality of encryption keys that change in a time-dependent manner according to other embodiments. The plurality of D encryption keys may be or correspond to key seed tables.

The key block 150 may generate a key seed table corresponding to the random number according to the set key seed table operation policy. The key seed table may include a plurality of key seed values that are mapped to each of the plurality of addresses. The aforementioned address may be an address of data for executing encryption/decryption, for example, the address of the external memory 300. There may be a plurality of key seed table operation policies according to some example embodiments, and at least one key seed table operation policy may be set, depending on user's settings and/or system settings.

The key block 150 may extract one of the key seed values from the generated key seed table by referring to the target address, and may store the extracted key seed value in the key register 160 as a D encryption key.

The key block 150 may include a key seed table manager 151, a key seed table storage unit 152, and a key seed feeder 153. The key seed table manager 151 may set at least one key seed table operation policy. As an example, the key seed table manager 151 may set at least one operation policy, depending on user's settings and/or system settings. The operation policy may include, for example, policy of at least one of memory block size, address, and update cycle of the key seed table.

In some example embodiments, the key seed table manager 151 may change the table element for the entire security area 350 of the external memory 300 on the basis of the operation policy. Alternatively, the key seed table manager 151 may change the table element for a part of the security area 350, and/or may vary the change position or vary the change cycle by the operation policy.

For example, the update cycle of the key seed table may have the same update cycle as the data seed table, and as another example, they may have different update cycles from each other depending on separate conditions. The key seed table manager 151 may generate a key seed table according to the operation policy on the basis of the random number.

The key seed table storage unit 152 stores the key seed table generated from the key seed table manager 151. The key seed table may be a plurality of key seed values (Seed Value K1 to Seed Value KN) which are mapped to each of a plurality of addresses (Address 1 to Address N).

When the key seed feeder 153 receives the target address from the CPU 110, the key seed feeder 153 extracts a key seed value (Seed Value Kk) corresponding to the target address (Address k) from the data seed table stored in the data seed table storage unit 152.

The key register 160 may store the extracted key seed value (Seed Value K) as D encryption key.

For example, the data block 130 masks (primary encryption) the data to be transmitted to and/or received from the outside of the iSE 100, and the encryption engine 140 encrypts (secondary encryption) the masking data DATA by the D encryption key, thereby further improving the confidentiality and integrity of the data. However, despite encryption of a plurality of degrees, since the seed value or the D encryption key may be leaked to an external attack, at least one of the seed value or the D encryption key may have a value that changes in a time-dependent manner.

According to some example embodiments, since the data is encrypted and/or decrypted with the D encryption key and transmitted to and received from the external memory 300, the confidentiality of data may be or may be more likely to be maintained. Alternatively or additionally, according to some example embodiments, it may be possible to make the attacker difficult to predict the contents of the data stored in the external memory 300, by changing and using the D encryption key and/or the data seed value on the basis of a specific or predetermined operation policy, and integrity may be more likely to be maintained.

Figure 5:
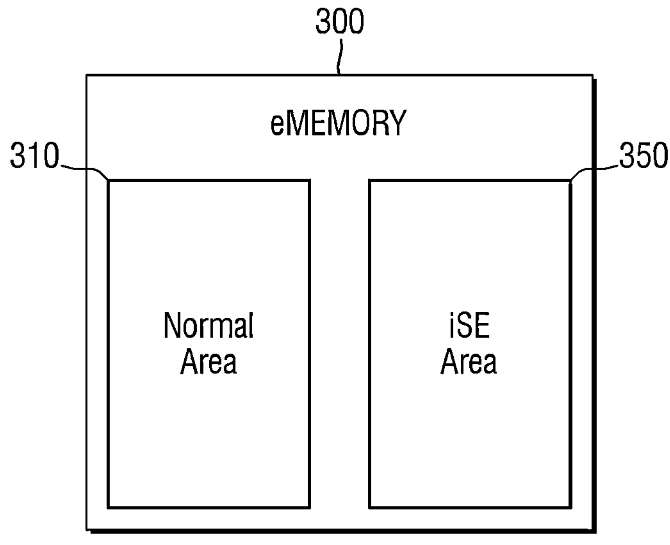
FIG. 5 is a diagram that specifically shows the external memory shown in FIG. 1.
Figure 6:
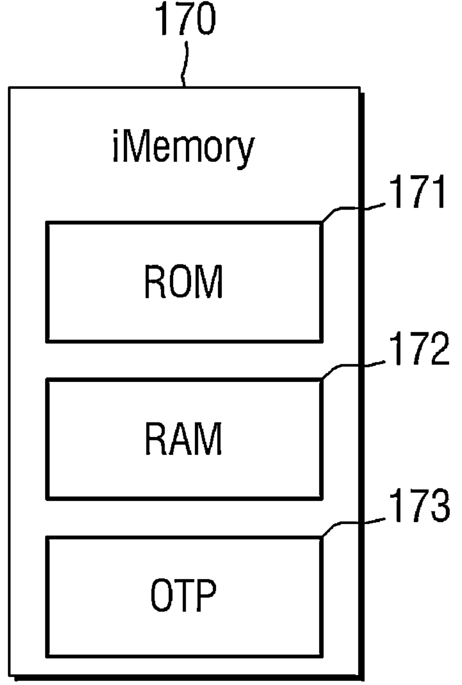
FIG. 6 is a diagram that specifically shows the internal memory shown in FIG. 1.

FIG. 5 is a diagram that specifically shows the external memory shown in FIG. 1, and FIG. 6 is a diagram that specifically shows the internal memory shown in FIG. 1.

Referring to FIGS. 1 and 5, the external memory 300 may be divided into a normal area 310 for storing data that does not require security, and a secure area 350 for storing the security data. There may or may not be a common area between the normal area 310 and the secure area 350.

As described above, for example, the security data may include at least one of information about a security application, information associated with a financial payment service, or information associated with an embedded service. Information about the security application may include, for example, biometric information such as user authentication information.

Alternatively or additionally, the security data may include software, code and/or data necessary for providing the execution of applications for secure storage and payment, authentication or various other services.

Referring to FIGS. 1 and 6, the internal memory 170 is a memory included in the iSE 100, and may include at least one of a ROM (Read Only Memory, hereinafter ROM) 171, a RAM (Random Access Memory, hereinafter RAM) 172, and an OTP (One Time Programmable Memory, hereinafter OTP) 173.

The ROM 171 may store setting codes associated with the operation of the iSE 100 according to some example embodiments. As an example, the setting code may manage the data access operation or the like between the iSE 100 and peripherals 10, 20, 30, and 400. Alternatively or additionally, the ROM 171 may store the setting code for the data seed table operation policy or the key seed table operation policy described in FIGS. 2 to 4.

When the SoC 1 is powered on or upon or in response to the SoC 1 being powered on, the iSE 100 transmits a first setting code associated with the data seed table operation policy stored in the ROM 171 to the data seed table manager 131, and the data seed table manager 131 sets the data seed table operation policy on the basis of the first setting code. When the SoC 1 is powered on or upon or in response to the SoC 1 being powered on, the iSE 100 transmits a second setting code associated with the key seed table operation policy stored in the ROM 171 to the key seed table manager 151, and the key seed table manager 151 sets the key seed table operation policy on the basis of the second setting code.

The RAM 172 may be or may include an operating memory of the iSE 100. For example, the RAM 172 may store the seed tables 132 and 152 described in FIGS. 2 to 4.

According to some example embodiments, the OTP 173 may include a random number generator 120. The iSE 100 may generate a random number on the basis of the random number generator 120 stored in the OTP 173, and the random number may be used to generate a data seed table in the data block 130, and/or may be used to generate a key seed table in the key block 150.

Figure 7:
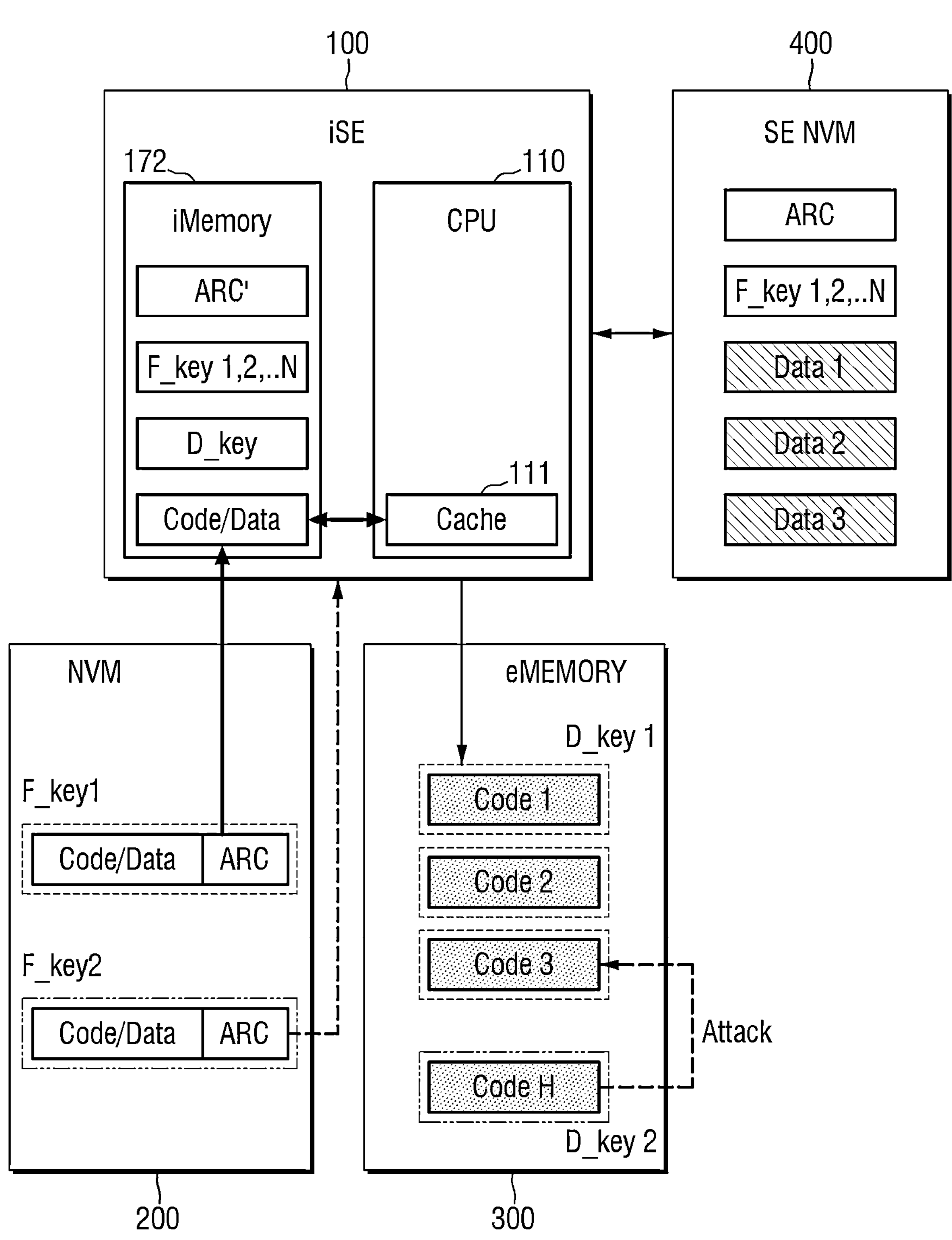
FIG. 7 is a conceptual diagram for explaining an operating method of the SoC according to some example embodiments.

FIG. 7 is a conceptual diagram for explaining an operating method of the SoC according to some example embodiments.

Referring to FIG. 7, when the SoC 1 is powered on or upon or in response to the SoC 1 being powered on, the SoC 1 reads code and/or data (hereinafter referred to as first data for convenience of explanation) stored in the non-volatile memory device 200. The iSE 100 reads a F encryption key (F_key1) from the dedicated external memory 400, and the host hardware module 30 decrypts the first data received by the non-volatile memory device 200 with the F encryption key, and stores the first data in the internal memory 170 of the iSE 100. At this time, the ARC of the transmitted first data increases.

The CPU 110 processes the first data stored in the internal memory 170, and stores the second data appearing in the processing in the cache 111. The second data may be, for example, application code and/or setting code required in the iSE 100.

The CPU 110 transmits the second data stored in the cache 111 to a target address of the external memory 300. The iSE 100 masks (e.g. Boolean masks) the second data (Code 1, Code 2, and Code 3) with the seed value, encrypts it with D encryption key (D_key1), and transmits it to the external memory 300. The external memory 300 stores the second encrypted data in the security area 350. At this time, at least one of the seed value or the D encryption key may vary dynamically. The second data stored in the external memory 300 is loaded into the internal memory 170 and may be used for the processing operation of the CPU 110.

As used herein, a dynamic variation of the seed value and/or D encryption key may refer to the seed value or the encryption key being time-dependent, for example being based on a time of generation. The seed value and/or the D encryption key that varies dynamically may not be repeated from a previous power-on event and/or may not be repeated again in another power-on event.

The security data generated by the processing operation of the CPU 110 may be stored in the dedicated external memory 400.

If an attacker who attempts to attack from the outside acquires and uses the data stored in the external memory 300, because the D encryption key (D_key2) used at the time of the attack is different from the D encryption key (D_key1) at the time of storing the data, the second data (Code H) based on the D encryption key (D_key2) becomes invalid data.

When the SoC 1 is powered off, or when the SoC is to be powered off or turned off for example upon a user-command, the iSE 100 may transmit the second data stored in the internal memory 170 and/or the cache 111 to the non-volatile memory 200 before power-off or as part of a power-off operation. At this time, the second data is decrypted and unmasked with the D encryption key and/or seed value that varies dynamically in a time-dependent manner, and then is encrypted with the F encryption key and may be stored in the non-volatile memory device 200.

Figure 8:
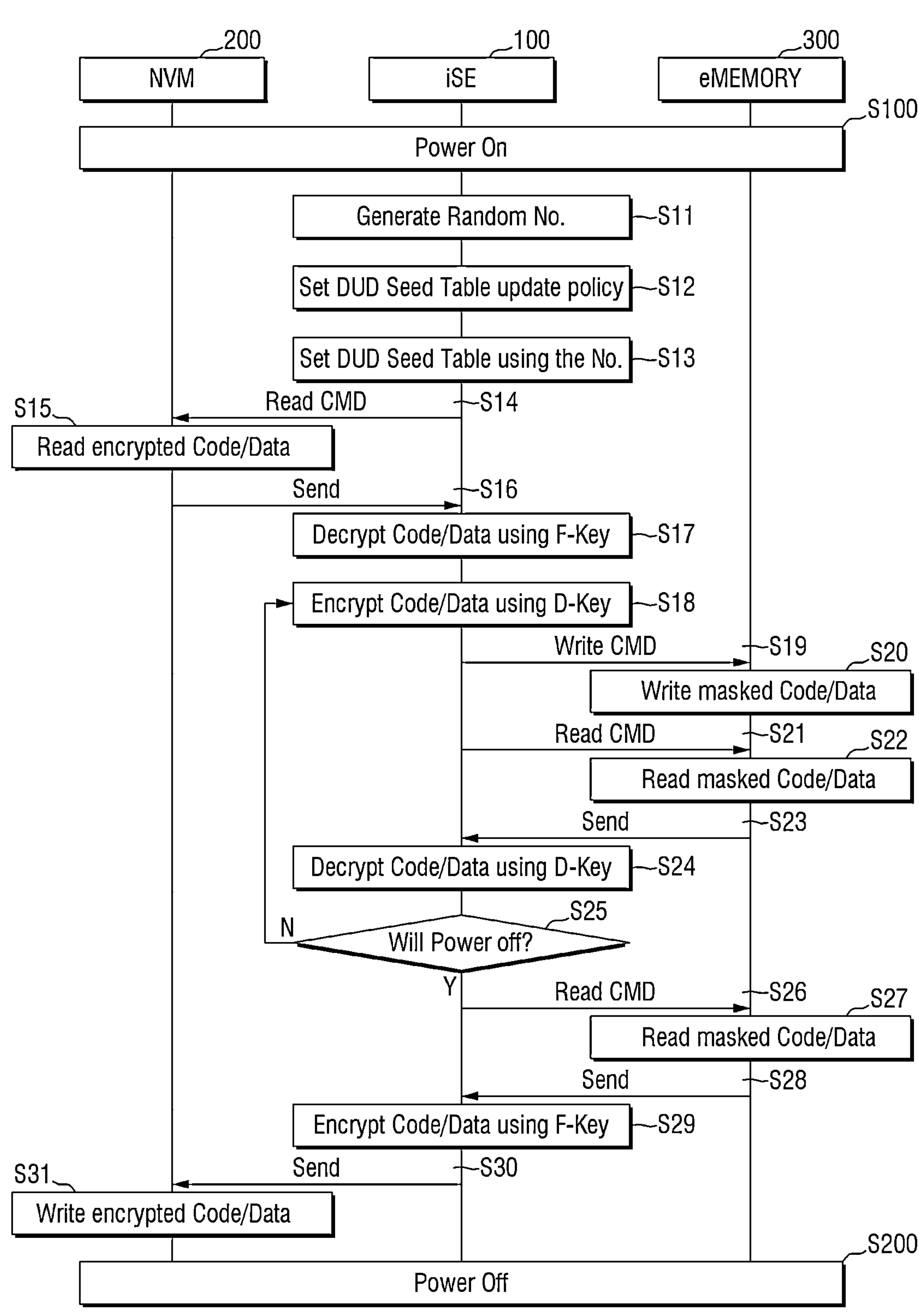
FIGS. 8 and 9 are flowcharts for explaining the operating method of the SoC according to some example embodiments.
Figure 9:
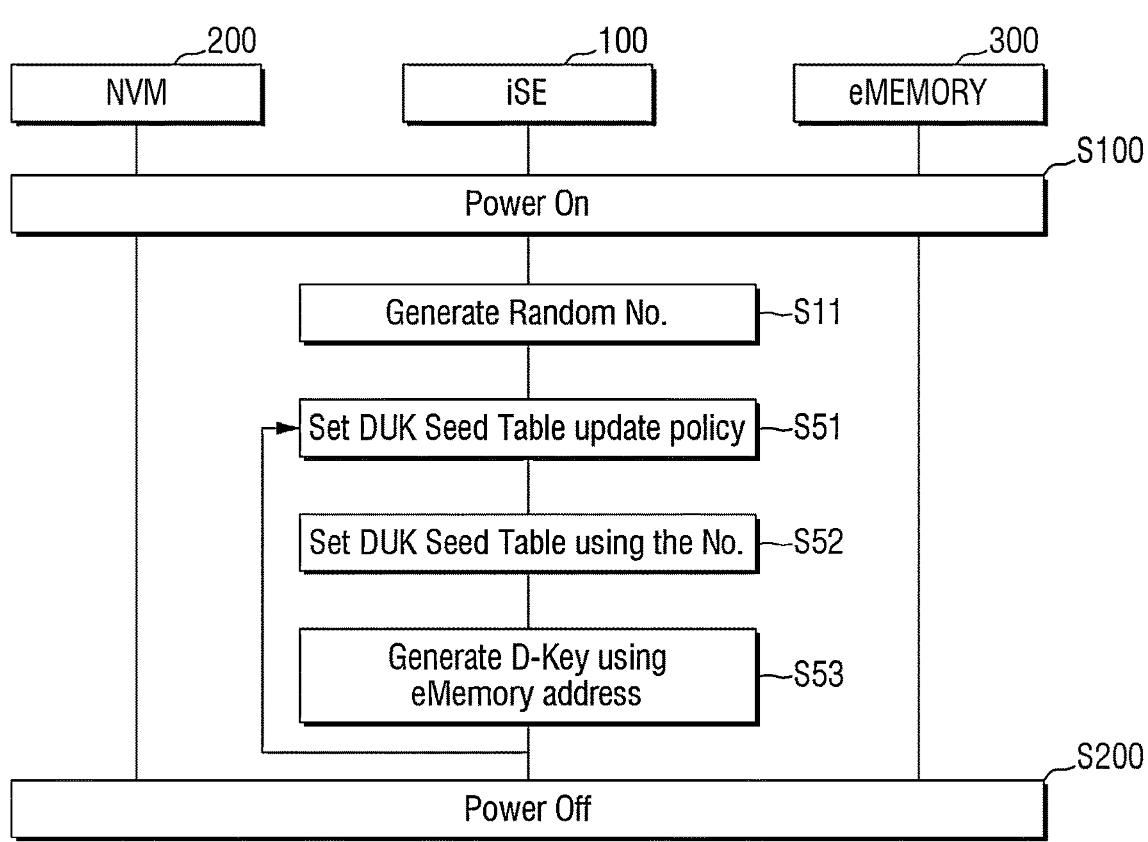

FIGS. 8 and 9 are flowcharts for explaining the operating method of the SoC according to some example embodiments.

Referring to FIGS. 8 and 9, when the SoC 1 is powered on (S100), or in response to the SoC 1 being powered on, the iSE 100 generates the random numbers (S11), and sets the data seed table operation policy and the key seed table operation policy (S12, S51). The iSE 100 generates the data seed table based on the random number according to the set data seed table operation policy (S13), and generates a key seed table based on the random number according to the set key seed table operation policy (S52).

The iSE 100 reads the first data (code and/or data) stored in the non-volatile memory device 200 (S14, S15), and decrypts the read first data with the F encryption key (S16, S17). At this time (S15) the non-volatile memory device 200 may not send a hash value to the iSE 100 corresponding to a hash of the code and/or data in conjunction with the ARC; however, example embodiments are not limited thereto. The F encryption key may be a value stored in the dedicated external memory 400 of the iSE 100.

The iSE 100 processes the first data to generate the second data, and encrypts the second data using the D encryption key to store the second data in the external memory 300 (S18). At this time, the second data may be or may include data in which the decrypted first data is masked with the seed value. In this case, the seed value may be or may include a data seed value corresponding to the target address where the first data is stored in the data seed table of S13. The D encryption key may be or may include a key seed value corresponding to the target address where the first data is stored in the key seed table of S52 (S53). The second data encrypted with the D encryption key is transmitted to the external memory 300 and may be stored in the eternal memory 300 (S19, S20).

According to some example embodiments, the data seed table and/or the key seed table may be maintained until the random number is changed, the random number may be kept constant, for example, from the time of the power-on to the time of the power-off (S100 to S200), and as another example, the random number may be changed aperiodically and/or periodically.

Depending on the operation of the iSE 100, the external memory 300 may receive the read command of the stored data (S21). The external memory 300 reads the third data of the target address according to the read command (S22), and transmits the third data to the iSE 100 (S23). The iSE 100 may decrypt the third data with a D encryption key based on the target address, and unmask the third data with a seed value based on the target address (S24).

If the SoC 1 is powered off (S25) for example under command of a user and/or from a sudden power-off event, the iSE 100 reads the fourth data present in the internal memory 170, the cache 111 or the external memory 300 (S26, S27, S28). The iSE 100 may encrypt the read fourth data with the F encryption key (S29), store the fourth data in the non-volatile memory device 200 (S30, S31), and then may turn off the power.

FIGS. 10 to 14 show SoCs according to some example embodiments. Repeated explanation will not be provided, and differences from the above-described embodiment will be mainly described.

Figure 10:
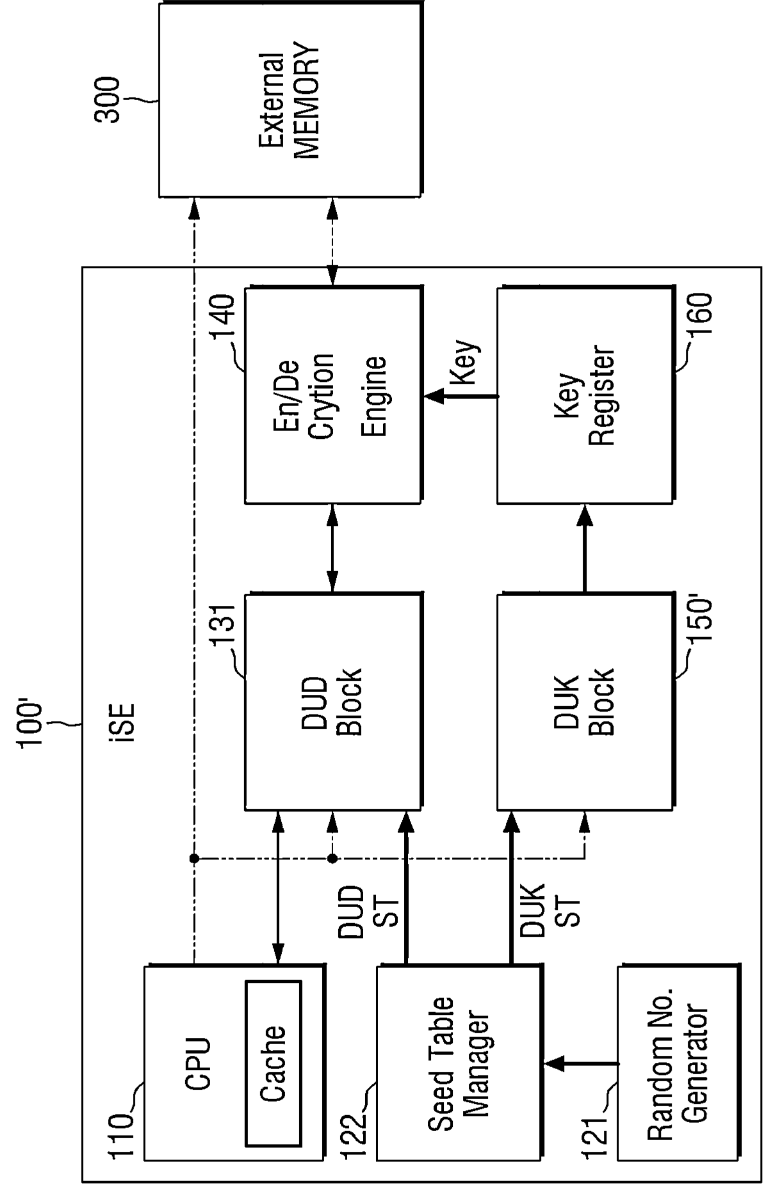
FIG. 10 is a block diagram that specifically shows a SoC according to some example embodiments.

FIG. 10 is a block diagram that specifically shows a SoC according to some example embodiments.

Referring to FIG. 10, an iSE 100' according to some example embodiments may include a CPU 110, a random number generator 121, a seed table manager 122, a data block 130', a key block 150', an encryption engine 140, and a key register 160.

In the iSE 100' of FIG. 10, the seed table manager 122 may be implemented separately from the data block 130' and the key block 150', unlike FIGS. 3 and 4. In this case, the data block 130' may include a data seed table storage unit 132, a data seed feeder 133, and masking circuits 135 and 137. Further, the key block 150' may include a key seed table storage unit 152 and a key seed feeder 153.

The seed table manager 122 may include each of a data seed table operation policy and a key seed table operation policy. The seed table manager 122 may generate a data seed table according to the data seed table operation policy on the basis of the random number, and may store the data seed table in the data seed table storage unit 132. The seed table manager 122 may generate a key seed table according to the key seed table operation policy on the basis of the random number and store it in the key seed table storage unit 152.

Figure 11:
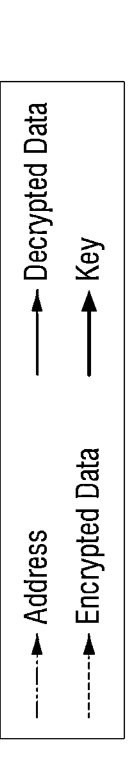
FIG. 11 is a block diagram that specifically shows a SoC according to some example embodiments.
Figure 12:
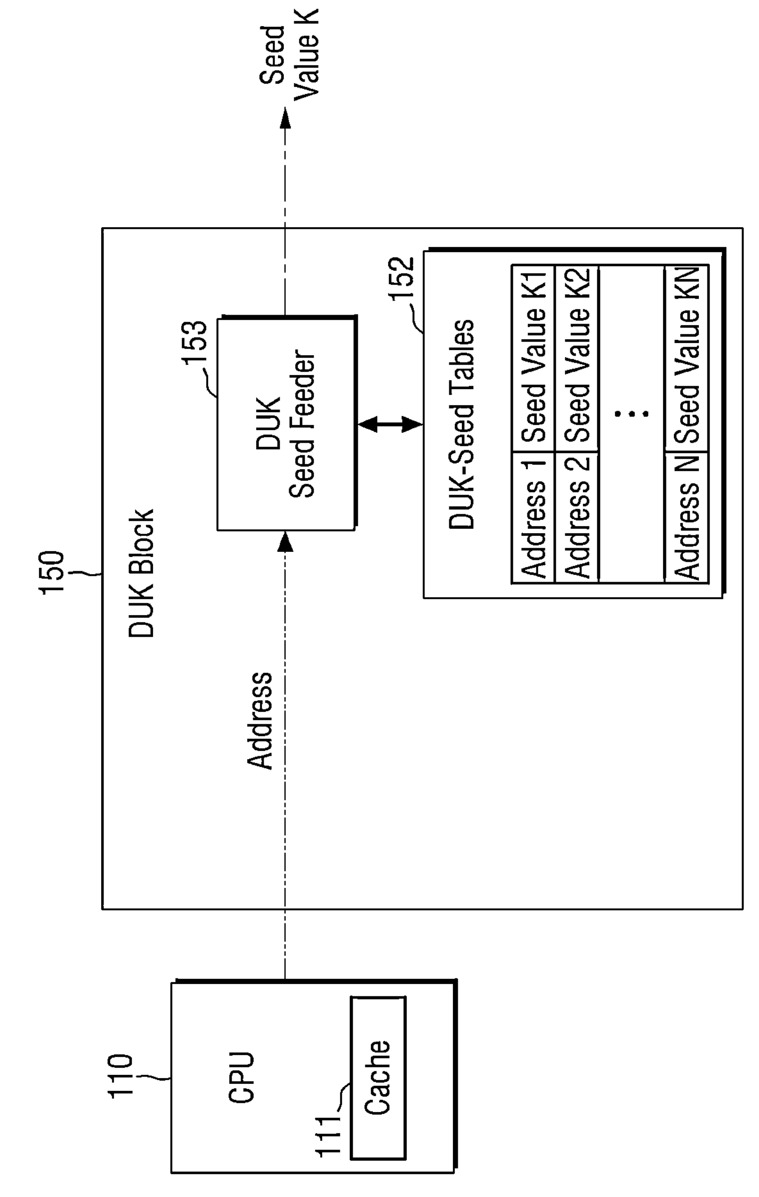
FIG. 12 is a block diagram that specifically shows a key block shown in FIG. 11.
Figure 12:
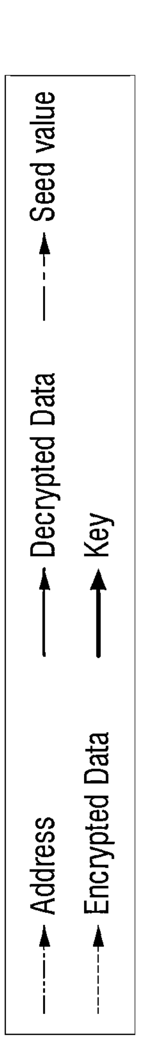

FIG. 11 is a block diagram that specifically shows a SoC according to some example embodiments, and FIG. 12 is a block diagram that specifically shows a key block shown in FIG. 11.

Referring to FIG. 11, the iSE 100 according to some example embodiments may include a CPU 110, a random number generator 120, a data block 130, a key block 150, an encryption engine 140, and a key register 160. Unlike FIG. 2, the random number may be input only to the data block 130 and may not input to the key block 150.

Referring to FIG. 12, in the data block 130 according to some example embodiments, the data seed value changes according to the change of the random number, and the data seed value may be stored in the external memory 300 as a masked value. The key block 130 includes a key seed table 152 that set in advance without referring to the random number. The key seed feeder 153 may extract the key seed value (seed value k) corresponding to the target address (address k) from the key seed table 152 and use the key seed value as the encryption key.

Figure 13:
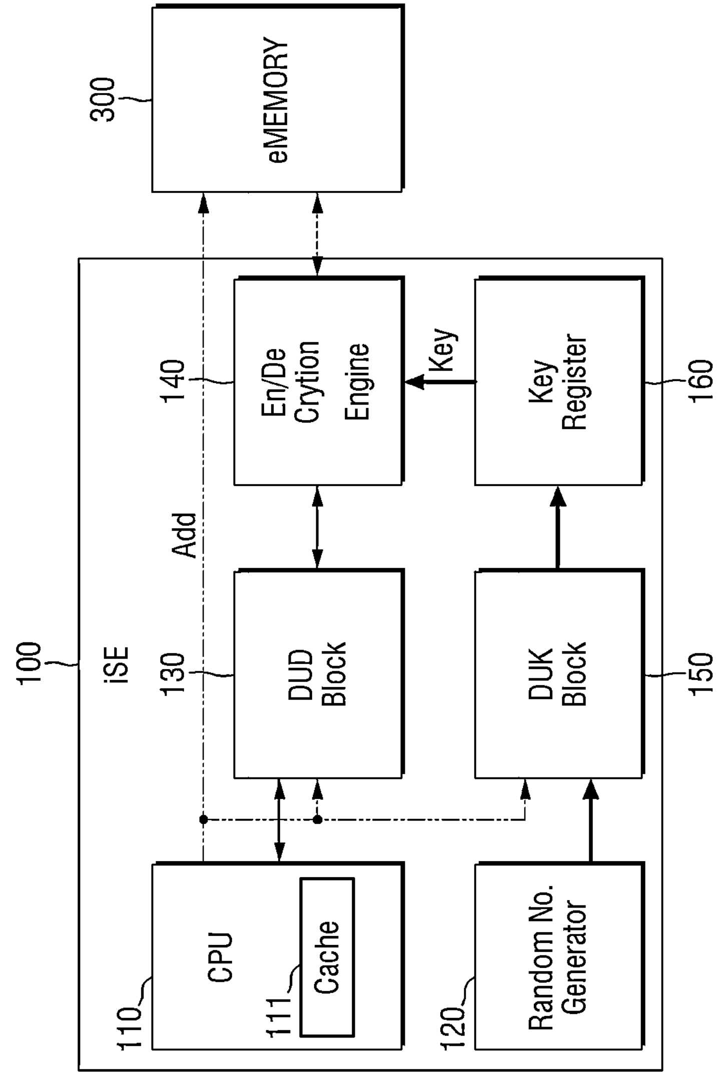
FIG. 13 is a block diagram that specifically shows a SoC according to some example embodiments.
Figure 13:
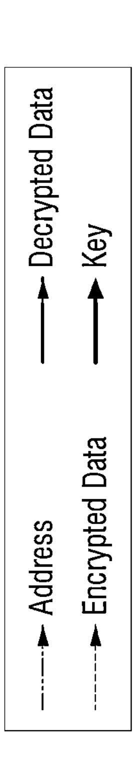
Figure 14:
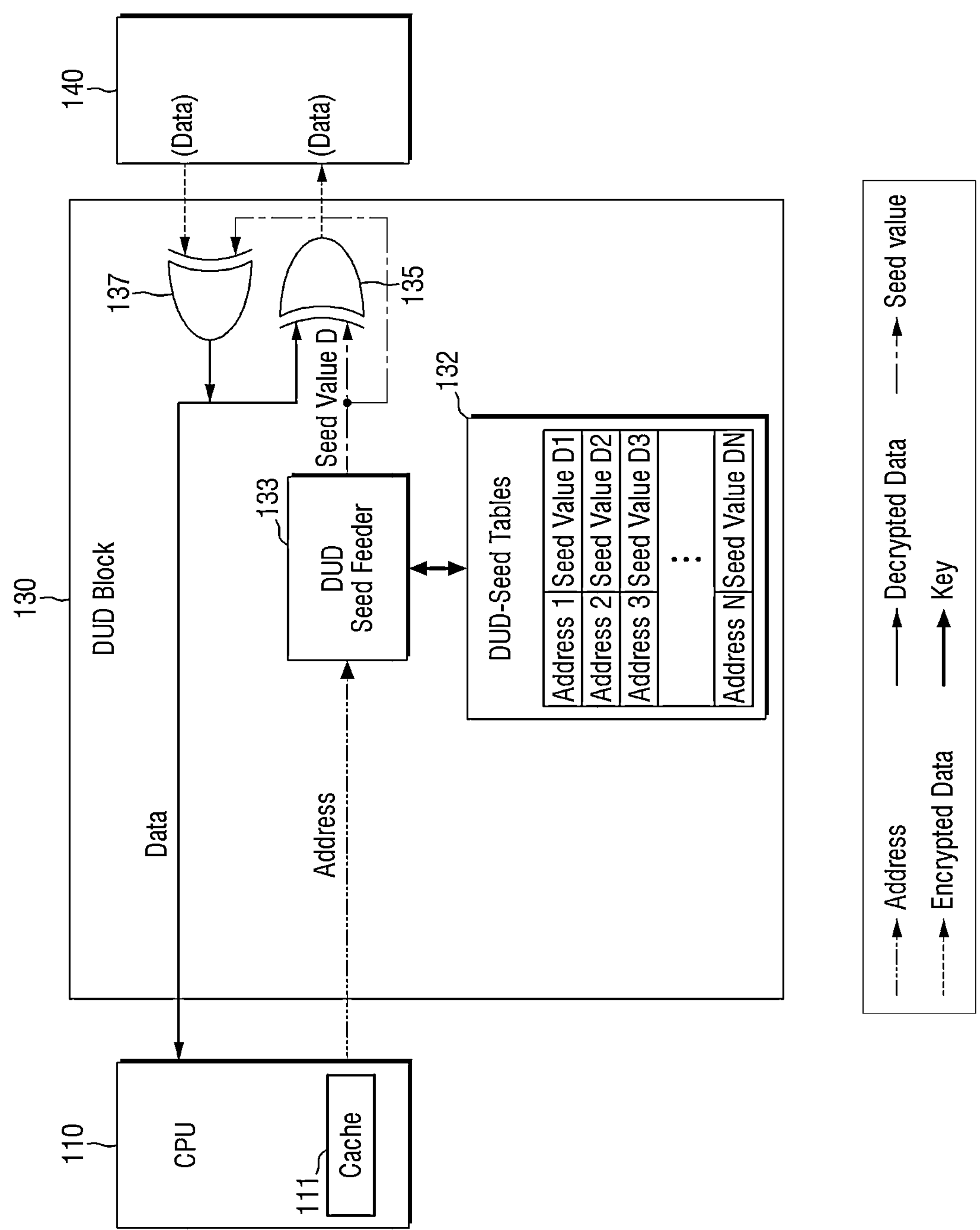
FIG. 14 is a block diagram that specifically shows a data block shown in FIG. 13.

FIG. 13 is a block diagram that specifically shows a SoC according to some example embodiments, and FIG. 14 is a block diagram that specifically shows a data block shown in FIG. 13.

Referring to FIG. 13, the iSE 100 according to some example embodiments may include a CPU 110, a random number generator 120, a data block 130, a key block 150, an encryption engine 140, and a key register 160. The random number may not be input to data block 130, and may be input only to the key block 150, unlike as in FIG. 2.

Referring to FIG. 14, the data block 130 according to some example embodiments extracts the seed value corresponding to the target address from the preset and stored data seed table 132 and mask/unmask the data. The key block 130 may extract the key seed value corresponding to the target address from the key seed table 152 generated by referring to the random number, and may use the key seed value as an encryption key.

For example, in example embodiments of FIGS. 11 to 14, only one of the data block and the key block may be changed on the basis of the random number. When only one of the seed value and the key is dynamically changed, since the seed table is generated and used more quickly than in the embodiment of FIGS. 2 to 5, the operating speed may be further improved.

Any of the elements disclosed above may include and/or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

None of the above-described example embodiments are necessarily mutually exclusive to one another. For example, some example embodiments may include features described with reference to one or more figures, and also may include features described with reference to other figures. Example embodiments are not limited thereto.

While inventive concepts has been particularly shown and described with reference to embodiments thereof, it will be understood that various changes in form and details may be made therein without departing from the spirit and scope of the following claims.

What is claimed is:

1. An operating method of SoC (System on Chip) including a secure element, the method comprising:
- generating a random number in response to power of the SoC being turned on;
- transmitting a first setting code stored in a read only memory (ROM) of the SoC to a seed table manager and the seed table manager sets a seed table operation policy based on the first setting code;
- transmitting a second setting code stored in the read only memory (ROM) of the SoC to a key seed table manager and the key seed table manager sets a key seed table operation policy based on the second setting code;
- generating a seed table based on the random number, the generating the seed table on the basis of the seed table operation policy;
- generating a key seed table based on the random number, the generating the key seed table on the basis of the key seed table operation policy;
- masking a first data with a first data seed value corresponding to a target address value extracted from the seed table;
- extracting a key seed value corresponding to the target address value from the key seed table to generate a first varied encryption key;
- encrypting the masked first data with the first varied encryption key input from a key register; and
- writing encrypted masked first data to a target address of an external memory corresponding to the target address value extracted from the seed table, and
- wherein at least one of the first data seed value or the first varied encryption key changes dynamically.

2. The operating method of SoC of claim 1, wherein the generating the random number includes generating the random number aperiodically depending on a trigger condition.

3. The operating method of SoC of claim 1, wherein the seed table operation policy includes at least one of a variable range scheme, a variable scheme of position, or a change cycle of a table element included in the seed table.

4. The operating method of SoC of claim 1, further comprising:
- decrypting a second data received from the external memory by using a second varied encryption key; and
- unmasking the decrypted second data with a second data seed value corresponding to an address value of the second data.

5. The operating method of SoC of claim 4, wherein at least one of the second varied encryption key or the second data seed value is generated based on the random number and is different from both the first varied encryption key and the first data seed value.

6. The operating method of SoC of claim 1, wherein the first data is data which is read from a non-volatile memory device and is decrypted with a first saved encryption key.

7. A SoC (System On Chip) connected to an external memory, the SoC comprising:
- secure element circuitry which includes a CPU and processing circuitry configured to output a target address value and a write command,
- wherein the processing circuitry is configured to,
  - generate a random number in response to power of the SoC being turned on;
  - transmit a first setting code stored in a read only memory (ROM) of the SoC to a seed table manager and the seed table manager sets a seed table operation policy based on the first setting code,
  - transmit a second setting code stored in the read only memory (ROM) of the SoC to a key seed table manager and the key seed table manager sets a key seed table operation policy based on the second setting code,
  - generate a data seed table based on the random number, the generating the data seed table on the basis of the seed table operation policy,
  - generate a key seed table based on the random number, the generating the key seed table on the basis of the key seed table operation policy,
  - mask a first data with a data seed value corresponding to the target address value of the data seed table,
  - extract a key seed value corresponding to the target address value from a the key seed table to generate a first varied encryption key,
  - encrypt the masked first data with the first varied encryption key, and
  - store the encrypted masked first data and an anti-replay counter (ARC) in the external memory,
- wherein at least one of the data seed value or the first varied encryption key is configured to change dynamically based on the seed table operation policy, and
- wherein the ARC increases in value each time the encrypted masked first data is transmitted.

8. The SoC of claim 7, wherein the external memory includes a volatile memory that includes a security area configured to store the encrypted masked first data, and a normal area configured to store unencrypted general data.

9. The SoC of claim 7, wherein the data seed table and the key seed table are generated in accordance with a dynamically changing random number, and
- the secure element circuitry includes:
- data block circuitry configured to extract the data seed value and to mask the first data;
- key block circuitry configured to extract the key seed value corresponding to the target address value;
- a key register configured to store the key seed value as the first varied encryption key; and
- encryption engine circuitry configured to encrypt the masked first data with the stored first varied encryption key and to output the encrypted masked first data to the external memory.

10. The SoC of claim 7, wherein the data seed table is generated in accordance with a dynamically changing random number, and the key seed table is a predetermined table, and
- the secure element circuitry includes:
- data block circuitry configured to mask the first data with the data seed value;
- key block circuitry configured to extract the key seed value corresponding to the target address value;

a key register configured to store the key seed value as the first varied encryption key; and encryption engine circuitry configured to encrypt the masked first data with the stored first varied encryption key and to output the encrypted masked first data to the external memory.

11. The SoC of claim 7, wherein the data seed table includes a first table, and the key seed table is generated in accordance with a dynamically changing random number, and the secure element circuitry includes:

data block circuitry configured to extract the data seed value corresponding to the target address value and masks the first data with the data seed value;

key block circuitry configured to extract the key seed value;

a key register that stores the key seed value as the first varied encryption key; and encryption engine circuitry configured to encrypt the masked first data with the stored first varied encryption key and to output the encrypted masked first data to the external memory.

12. The SoC of claim 7, wherein the seed table operation policy includes at least one of a variable range scheme, a variable scheme of position, or a change cycle of a table element included in the data seed table.

13. The SoC of claim 7, wherein the SoC is configured to apply the seed table operation policy to at least one of the data seed table or the key seed table.

14. The SoC of claim 7, wherein the SoC is connected to each of a dedicated memory and a non-volatile memory, the non-volatile memory configured to store at least one first saved encryption key, the processing circuitry is further configured to, encrypt second data with a first saved encryption key received from the dedicated memory, and write the encrypted second data to the non-volatile memory.

15. The SoC of claim 14, wherein the SoC is configured to encrypt the second data stored in an internal memory of the secure element circuitry or the external memory and write the encrypted second data to the non-volatile memory, in response to power of the SoC being turned off.

16. An operating method of a secure element circuitry, the method comprising:

generating a random number in a time-dependent manner in response to power of the secure element circuitry being turned on;

transmitting a first setting code stored in a read only memory (ROM) of the secure element circuitry to a data seed table manager and the data seed table manager sets a data seed table operation policy based on the first setting code stored in a read only memory (ROM);

transmitting a second setting code stored in the read only memory (ROM) of the secure element circuitry to a key seed table manager and the key seed table manager sets a key seed table operation policy based on the second setting code stored in the read only memory (ROM);

setting a data seed table corresponding to the random number in accordance with the data seed table operation policy;

setting a key seed table corresponding to the random number in accordance with the key seed table operation policy;

reading first data from a non-volatile memory device;

masking the first data with a data seed value corresponding to a target address of an external memory; and writing the masked first data to the target address of the external memory, wherein the first data read from the non-volatile memory device is encrypted.

17. The operating method of the secure element circuitry of claim 16, wherein the data seed table operation policy includes at least one of a variable range scheme, a variable scheme of position, or a change cycle of a table element included in the data seed table.

18. The operating method of the secure element circuitry of claim 16, wherein the masking the first data includes:

decrypting the read first data, using a first varied encryption key for the non-volatile memory device;

extracting the data seed value corresponding to a target address value from the set data seed table;

masking the decrypted first data, using the data seed value; and encrypting the masked first data, using a stored encryption key, wherein the target address value from the set data seed table matches the target address of the external memory.

19. The operating method of the secure element circuitry of claim 18, further comprising:

reading a second data stored in the external memory;

decrypting the second data, using a first saved encryption key; and unmasking the decrypted second data with the data seed value.

20. The operating method of the secure element circuitry of claim 18, wherein when the power of the secure element circuitry is turned on, the method further includes setting the key seed table operation policy, in response to the power being turned on;

setting the key seed table corresponding to the random number in accordance with the key seed table operation policy; and extracting a first saved encryption key from the key seed table, the first saved encryption key corresponding to the target address value.

* * * * *